US010175335B1

(12) United States Patent
Stefanakis et al.

(10) Patent No.: US 10,175,335 B1
(45) Date of Patent: Jan. 8, 2019

(54) DIRECTION OF ARRIVAL (DOA) ESTIMATION APPARATUSES, METHODS, AND SYSTEMS

(71) Applicant: Foundation for Research and Technology—Hellas (FORTH), Heraklion, Crete (GR)

(72) Inventors: Nikolaos Stefanakis, Heraklion (GR); Athanasios Mouchtaris, Heraklion (GR)

(73) Assignee: FOUNDATION FOR RESEARCH AND TECHNOLOGY-HELLAS (FORTH), Heraklion (GR)

( * ) Notice: Subject to any disclaimer, the term of this patent is extended or adjusted under 35 U.S.C. 154(b) by 429 days.

(21) Appl. No.: 15/183,538

(22) Filed: Jun. 15, 2016

Related U.S. Application Data

(63) Continuation of application No. 15/001,190, filed on Jan. 19, 2016, and a continuation-in-part of application No. 14/556,038, filed on Nov. 28, 2014, now Pat. No. 9,549,253, which is a continuation-in-part of application No. 14/294,095, filed on Jun. 2, 2014, now Pat. No. 9,955,277, which is a continuation-in-part of application No. 14/038,726, filed on Sep. 26, 2013, now Pat. No. 9,554,203.

(60) Provisional application No. 62/104,601, filed on Jan. 16, 2015, provisional application No. 61/909,882, filed on Nov. 27, 2013, provisional application No.
(Continued)

(51) Int. Cl.
*G01S 3/80* (2006.01)
*G01S 3/802* (2006.01)

(52) U.S. Cl.
CPC .................... *G01S 3/802* (2013.01)

(58) Field of Classification Search
USPC ........................................................ 367/129
See application file for complete search history.

(56) References Cited

U.S. PATENT DOCUMENTS

| | | | |
|---|---|---|---|
| 7,555,161 | B2 | 6/2009 | Haddon et al. |
| 7,826,623 | B2 | 11/2010 | Christoph |
| 8,073,287 | B1 | 12/2011 | Wechsler et al. |

(Continued)

OTHER PUBLICATIONS

B. Loesch et al., "Multidimensional localization of multiple sound sources using frequency domain ICA and an extended state coherence transform," *IEEE/SP 15th Workshop Statistical Signal Processing (SSP)*, pp. 677-680, Sep. 2009.
(Continued)

*Primary Examiner* — James R Hulka
(74) *Attorney, Agent, or Firm* — Norton Rose Fulbright US LLP

(57) ABSTRACT

A processor-implemented method for direction-of-arrival estimation. The method includes: receiving a plurality of input signals at a sensor array, each sensor having an angle estimator and a cross-spectra term; transforming the input signal from each of the plurality of sensors to the time-frequency domain using a short-time Fourier transform; constructing a Perpendicular Cross-Spectra Difference (PCSD) for each of the plurality of angle estimators associated with each sensor for each frequency bin and time index; calculating an auxiliary observation for each of the angle estimators; and determining an impinging angle for each of the angle estimators based on the auxiliary observation.

17 Claims, 11 Drawing Sheets

Related U.S. Application Data

61/829,760, filed on May 31, 2013, provisional application No. 61/706,073, filed on Sep. 26, 2012.

(56) References Cited

U.S. PATENT DOCUMENTS

| | | | |
|---|---|---|---|
| 8,923,529 B2 | 12/2014 | McCowan | |
| 9,031,268 B2* | 5/2015 | Fejzo | H04R 5/02 381/303 |
| 9,549,253 B2* | 1/2017 | Alexandridis | H04R 3/005 |
| 9,554,203 B1* | 1/2017 | Pavlidi | H04R 1/08 |
| 9,641,952 B2* | 5/2017 | Fejzo | H04R 5/02 |
| 9,955,277 B1* | 4/2018 | Alexandridis | H04R 3/005 |
| 9,967,660 B2* | 5/2018 | Tawada | H04R 3/005 |
| 10,057,383 B2* | 8/2018 | Shoaib | H04L 69/04 |
| 2006/0002608 A1* | 1/2006 | Haddon | G06T 7/0012 382/173 |
| 2007/0127736 A1* | 6/2007 | Christoph | H04R 1/406 381/92 |
| 2008/0089531 A1 | 4/2008 | Koga et al. | |
| 2009/0080666 A1 | 3/2009 | Uhle et al. | |
| 2010/0135511 A1 | 6/2010 | Pontoppidan | |
| 2010/0142327 A1 | 6/2010 | Kepesi et al. | |
| 2010/0217590 A1 | 8/2010 | Nemer et al. | |
| 2010/0278357 A1 | 11/2010 | Hiroe | |
| 2011/0033063 A1 | 2/2011 | McGrath et al. | |
| 2011/0091055 A1 | 4/2011 | LeBlanc | |
| 2011/0110531 A1 | 5/2011 | Klefenz et al. | |
| 2011/0164761 A1* | 7/2011 | McCowan | H04R 3/005 381/92 |
| 2012/0020485 A1 | 1/2012 | Visser et al. | |
| 2012/0051548 A1 | 3/2012 | Visser et al. | |
| 2012/0114126 A1 | 5/2012 | Thiergart et al. | |
| 2012/0140947 A1 | 6/2012 | Shin | |
| 2012/0221131 A1 | 8/2012 | Wang et al. | |
| 2012/0288124 A1* | 11/2012 | Fejzo | H04R 5/02 381/303 |
| 2013/0108066 A1 | 5/2013 | Hyun et al. | |
| 2013/0142343 A1 | 6/2013 | Matsui et al. | |
| 2013/0216047 A1 | 8/2013 | Kuech et al. | |
| 2013/0259243 A1 | 10/2013 | Herre et al. | |
| 2013/0268280 A1* | 10/2013 | Del Galdo | G10L 19/02 704/500 |
| 2013/0272548 A1 | 10/2013 | Visser et al. | |
| 2013/0287225 A1 | 10/2013 | Niwa et al. | |
| 2014/0025374 A1 | 1/2014 | Lou | |
| 2014/0172435 A1 | 6/2014 | Thiergart et al. | |
| 2014/0376728 A1 | 12/2014 | Rämö et al. | |
| 2015/0156578 A1* | 6/2015 | Alexandridis | H04R 3/005 381/92 |
| 2015/0230041 A1* | 8/2015 | Fejzo | H04R 5/02 381/303 |
| 2015/0310857 A1 | 10/2015 | Habets et al. | |
| 2016/0212245 A1* | 7/2016 | Shoaib | H04L 67/12 |
| 2017/0064444 A1* | 3/2017 | Tawada | H04S 7/307 |

OTHER PUBLICATIONS

A. Lombard et al., "TDOA estimation for multiple sound sources in noisy and reverberant environments using broadband independent component analysis," *IEEE Transactions on Audio, Speech, and Language Processing*, pp. 1490-1503, vol. 19, No. 6, Aug. 2011.

H. Sawada et al., "Multiple source localization using independent component analysis," *IEEE Antennas and Propagation Society International Symposium*, pp. 81-84, vol. 4B, Jul. 2005.

F. Nesta and M. Omologo, "Generalized state coherence transform for multidimensional TDOA estimation of multiple sources," *IEEE Transactions on Audio, Speech, and Language Processing*, pp. 246-260, vol. 20, No. 1, Jan. 2012.

M. Swartling et al., "Source localization for multiple speech sources using low complexity non-parametric source separation and clustering," in *Signal Processing*, pp. 1781-1788, vol. 91, Issue 8, Aug. 2011.

C. Blandin et al., "Multi-source TDOA estimation in reverberant audio using angular spectra and clustering," in *Signal Processing*, vol. 92, No. 8, pp. 1950-1960, Aug. 2012.

D. Pavlidi et al., "Real-time multiple sound source localization using a circular microphone array based on single-source confidence measures," in *International Conference on Acoustics, Speech and Signal Processing (ICASSP)*, pp. 2625-2628, Mar. 2012.

O. Yilmaz and S. Rickard, "Blind separation of speech mixtures via time-frequency masking," *IEEE Transactions on Audio, Speech, and Language Processing*, pp. 1830-1847, vol. 52, No. 7, Jul. 2004.

E. Fishler et al., "Detection of signals by information theoretic criteria: General asymptotic performance analysis," in *IEEE Transactions on Signal Processing*, pp. 1027-1036, vol. 50, No. 5, May 2002.

M. Puigt and Y. Deville, "A new time-frequency correlation-based source separation method for attenuated and time shifted mixtures," in *8th International Workshop on Electronics, Control, Modelling, Measurement and Signals 2007 and Doctoral School (EDSYS,GEET)*, pp. 34-39, May 28-30, 2007.

G. Hamerly and C. Elkan, "Learning the k in k-means," in *Neural Information Processing Systems*, Cambridge, MA, USA: MIT Press, pp. 281-288, 2003.

B. Loesch and B. Yang, "Source number estimation and clustering for underdetermined blind source separation," in *Proceedings International Workshop Acoustic Echo Noise Control (IWAENC)*, 2008.

S. Araki et al., "Stereo source separation and source counting with MAP estimation with dirichlet prior considering spatial aliasing problem," in *Independent Component Analysis and Signal Separation, Lecture Notes in Computer Science*. Berlin/Heidelberg, Germany: Springer, vol. 5441, pp. 742-750, 2009.

A. Karbasi and A. Sugiyama, "A new DOA estimation method using a circular microphone array," in *Proceedings European Signal Processing Conference (EUSIPCO)*, 2007, pp. 778-782.

S. Mallat and Z. Zhang, "Matching pursuit with time-frequency dictionaries," *IEEE Transactions on Signal Processing*, vol. 41, No. 12, pp. 3397-3415, Dec. 1993.

D. Pavlidi et al., "Source counting in real-time sound source localization using a circular microphone array," in *Proc. IEEE 7th Sensor Array Multichannel Signal Process. Workshop (SAM)*, Jun. 2012, pp. 521-524.

A. Griffin et al., "Real-time multiple speaker DOA estimation in a circular microphone array based on matching pursuit," in *Proceedings 20th European Signal Processing Conference (EUSIPCO)*, Aug. 2012, pp. 2303-2307.

P. Comon and C. Jutten, Handbook of Blind Source Separation: Independent Component Analysis and Applications, ser. Academic Press. Burlington, MA: Elsevier, 2010.

M. Cobos et al., "On the use of small microphone arrays for wave field synthesis auralization," *Proceedings of the 45th International Conference: Applications of Time-Frequency Processing in Audio Engineering Society Conference*, Mar. 2012.

H. Hacihabiboglu and Z. Cvetkovic, "Panoramic recording and reproduction of multichannel audio using a circular microphone array," in *Proceedings of the IEEE Workshop on Applications of Signal Processing to Audio and Acoustics (WASPAA 2009)*, pp. 117-120, Oct. 2009.

K. Niwa A. et al., "Encoding large array signals into a 3D sound field representation for selective listening point audio based on blind source separation," in *Proceedings of the IEEE International Conference on Acoustics, Speech and Signal Processing (ICASSP 2008)*, pp. 181-184, Apr. 2008.

V. Pulkki, "Spatial sound reproduction with directional audio coding," *Journal of the Audio Engineering Society*, vol. 55, No. 6, pp. 503-516, Jun. 2007.

F. Kuech et al., "Directional audio coding using planar microphone arrays," in Proceedings of the Hands-free Speech Communication and Microphone Arrays (HSCMA), pp. 37-40, May 2008.

O. Thiergart et al., "Parametric spatial sound processing using linear microphone arrays," in *Proceedings of Microelectronic Systems*, A. Heuberger, G. Elst, and R.Hanke, Eds., pp. 321-329, Springer, Berlin, Germany, 2011.

(56) References Cited

OTHER PUBLICATIONS

M. Kallinger et al., "Enhanced direction estimation using microphone arrays for directional audio coding," in *Proceedings of the Hands-free Speech Communication and Microphone Arrays (HSCMA)*, pp. 45-48, May 2008.
M. Cobos et al., "A sparsity-based approach to 3D binaural sound synthesis using time-frequency array processing," *Eurasip Journal on Advances in Signal Processing*, vol. 2010, Article ID 415840, 2010.
L.M. Kaplan et al., "Bearings-only target localization for an acoustical unattended ground sensor network," *Proceedings of Society of Photo-Optical Instrumentation Engineers (SPIE)*, vol. 4393, pp. 40-51, 2001.
A. Bishop and P. Pathirana, "Localization of emitters via the intersection of bearing lines: A ghost elimination approach," *IEEE Transactions on Vehicular Technology*, vol. 56, No. 5, pp. 3106-3110, Sep. 2007.
A. Bishop and P. Pathirana, "A discussion on passive location discovery in emitter networks using angle-only measurements," *International Conference on Wireless Communications and Mobile Computing (IWCMC)*, ACM, pp. 1337-1343, Jul. 2006.
J. Reed et al., "Multiple-source localization using line-of-bearing measurements: Approaches to the data association problem," *IEEE Military Communications Conference (MILCOM)*, pp. 1-7, Nov. 2008.
A. Alexandridis et al., "Directional coding of audio using a circular microphone array," *IEEE International Conference on Acoustics, Speech and Signal Processing (ICASSP)*, pp. 296-300, May 2013.
A. Alexandridis et al., "Capturing and Reproducing Spatial Audio Based on a Circular Microphone Array," *Journal of Electrical and Computer Engineering*, vol. 2013, Article ID 718574, pp. 1-16, 2013.
M. Taseska and E. Habets, "Spotforming using distributed microphone arrays," *IEEE Workshop on Applications of Signal Processing to Audio and Acoustics*, Oct. 2013.
S. Rickard and O. Yilmaz, "On the approximate w-disjoint orthogonality of speech," in *Proc. of ICASSP*, 2002, vol. 1, pp. 529-532.
N. Ito et al., "Designing the wiener post-filter for diffuse noise suppression using imaginary parts of inter-channel cross-spectra," in *Proc. of ICASSP*, 2010, pp. 2818-2821.
D. Pavlidi et al., "Real-time sound source localization and counting using a circular microphone array," *IEEE Trans. on Audio Speech, and Lang. Process*, vol. 21, No. 10, pp. 2193-2206, 2013.
L. Parra and C. Alvino, "Geometric source separation: merging convolutive source separation with geometric beamforming," *IEEE Transactions on Speech and Audio Processing*, vol. 10, No. 6, pp. 352-362, 2002.
V. Pulkki "Virtual sound source positioning using vector based amplitude panning," *J. Audio Eng. Soc.*, vol. 45, No. 6, pp. 456-466, 1997.
J. Usher and J. Benesty, "Enhancement of spatial sound quality: a new reverberation-extraction audio upmixer," *IEEE Trans. on Audio Speech, and Lang. Process*, vol. 15, No. 7, pp. 2141-2150, 2007.
C. Faller and F. Baumgarte, "Binaural cue coding-part ii: Schemes and application," *IEEE Trans. on Speech and Audio Process*, vol. 11, No. 6, pp. 520-531, 2003.
M. Briand, et al., "Parametric representation of multichannel audio based on principal component analysis," in *AES $120^{th}$ Conv.*, 2006.
M. Goodwin and J. Jot., "Primary-ambient signal decomposition and vector-based localization for spatial audio codding and enhancement," in *Proc. of ICASSP*, 2007, vol. 1, pp. 1-9.
J. He et al., "A study on the frequency-domain primary-ambient extraction for stereo audio signals," in *Proc. of ICASSP*, 2014, pp. 2892-2896.
J. He et al., "Linear estimation based primary-ambient extraction for stereo audio signals," *IEEE Trans. on Audio, Speech and Lang. Process.*, vol. 22, pp. 505-517, 2014.
C. Avendano and J. Jot, "A frequency domain approach to multichannel upmix," *J. Audio Eng. Soc*, vol. 52, No. 7/8, pp. 740-749, 2004.
O. Thiergart et al. "Diffuseness estimation with high temporal resolution via spatial coherence between virtual first-order microphones," in *Applications of Signal Processing to Audio and Acoustics (WASPAA)*, 2011, pp. 217-220.
G. Carter et al, "Estimation of the magnitude-squared coherence function via overlapped fast fourier transform processing," *IEEE Trans. on Audio and Electroacoustics*, vol. 21, No. 4, pp. 337-344, 1973.
I. Santamaria and J. Via, "Estimation of the magnitude squared coherence spectrum based on reduced-rank canonical coordinates," in *Proc. of ICASSP*, 2007, vol. 3, pp. III-985.
D. Ramirez, J. Via and I. Santamaria, "A generalization of the magnitude squared coherence spectrum for more than two signals: definition, properties and estimation," in *Proc. of ICASSP*, 2008, pp. 3769-3772.
B. Cron and C. Sherman, "Spatial-correlation functions for various noise models," *J. Acoust. Soc. Amer.*, vol. 34, pp. 1732-1736, 1962.
H. Cox et al., "Robust adaptive beamforming," *IEEE Trans. on Acoust, Speech and Signal Process*, vol. 35, pp. 1365-1376, 1987.
H. K. Maganti, D. Gatica-Perez, I. McCowan, "Speech Enhancement and Recognition in Meetings with an Audio-Visual Sensor Array," IEEE Transactions on Audio, Speech, and Language Processing, vol. 15, No. 8, Nov. 2007.

* cited by examiner

Fig. 5

|  | $E_{x,y}$ | $E_{-x,y}$ | $E_{u,v}$ | $E_{-u,v}$ |
|---|---|---|---|---|
| MBA | $y = -x$ | $y = x$ | $x = 0$ | $y = 0$ |
| Solution+ | $\theta^+ = \operatorname{asin}(-z_{x,y}) - \frac{\pi}{4}$ | $\theta^+ = -\operatorname{asin}(-z_{-x,y}) + \frac{\pi}{4}$ | $\theta^+ = \operatorname{asin}(-z_{u,v}) - \frac{\pi}{2}$ | $\theta^+ = -\operatorname{asin}(-z_{-u,v})$ |
| Solution− | $\theta^- = -\operatorname{asin}(-z_{x,y}) + \frac{3\pi}{4}$ | $\theta^- = \operatorname{asin}(-z_{-x,y}) - \frac{3\pi}{4}$ | $\theta^- = -\operatorname{asin}(-z_{u,v}) + \frac{\pi}{2}$ | $\theta^- = \operatorname{asin}(-z_{-u,v}) - \pi$ |
| Disamb. crit. | $\operatorname{sign}(\Im\{\hat{\phi}_u\})$ | $\operatorname{sign}(\Im\{\hat{\phi}_v\})$ | $\operatorname{sign}(\Im\{\hat{\phi}_y\})$ | $\operatorname{sign}(\Im\{\hat{\phi}_x\})$ |

DIRECTION OF ARRIVAL (DOA) ESTIMATION APPARATUSES, METHODS, AND SYSTEMS

CROSS-REFERENCE TO RELATED APPLICATIONS

This application is a continuation of U.S. patent application Ser. No. 15/001,190, filed Jan. 19, 2016, which in turn claims priority to U.S. Provisional Patent Application No. 62/104,601, filed Jan. 16, 2015. This application is also a continuation-in-part of U.S. patent application Ser. No. 14/556,038, filed Nov. 28, 2014 (claiming priority to U.S. Provisional Patent Application No. 61/909,882, filed Nov. 27, 2013); which is in turn a continuation-in-part of U.S. patent application Ser. No. 14/294,095, filed Jun. 2, 2014 (claiming priority to U.S. Provisional Patent Application No. 61/829,760 filed May 31, 2013); which is in turn a continuation-in-part of U.S. patent application Ser. No. 14/038,726 filed Sep. 26, 2013 (claiming priority to U.S. Provisional Patent Application No. 61/706,073 filed Sep. 26, 2012). This application is also related to U.S. patent application Ser. No. 15/001,211 and U.S. patent application Ser. No. 15/001,221, both of which were filed on Jan. 19, 2016. Each of the applications listed in this paragraph are expressly incorporated by reference herein in their entirety.

FIELD

The present subject matter is directed generally to apparatuses, methods, and systems for sound-source characterization, and more particularly, to DIRECTION OF ARRIVAL (DOA) ESTIMATION APPARATUSES, METHODS, AND SYSTEMS (hereinafter DOA Estimator).

BACKGROUND

In signal processing, direction of arrival (DOA) is the determination of the direction from which a propagating wave arrives at a sensor array. Direction-of-arrival estimation is one of the most important problems in array signal processing. DOA estimation has many applications. For example, localization of a sound source may be used to determine the position of the entity, and may also be used to recreate a realistic soundscape, that is for spatial sound recording that can be used to provide a surround-sound experience to a listener that emulates the originally recorded soundscape.

SUMMARY

A processor-implemented method for direction-of-arrival estimation is disclosed. The method includes: receiving a plurality of input signals at a sensor array having a plurality of spaced-apart sensors, each sensor having an angle estimator and a cross-spectra term; transforming, using a processor, the input signal from each of the plurality of sensors to the time-frequency domain using a short-time Fourier transform; constructing, using a processor, a Perpendicular Cross-Spectra Difference (PCSD) for each of the plurality of angle estimators associated with each sensor for each frequency bin and time index; calculating, using a processor, an auxiliary observation for each of the angle estimators; determining, using a processor, an impinging angle for each of the angle estimators based on the auxiliary observation, where the impinging angle is set equal to the empty set when the absolute value of the auxiliary observation is greater or equal to 1, and disambiguating, using processor, the impinging angle when the absolute value of the auxiliary observation is less than 1 by associating one disambiguation cross-spectra term with each angle estimator to determine a correct impinging angle based on the sign of the cross-spectra term.

A system for direction-of-arrival estimation is also disclosed. The system includes: a sensor array having a plurality of sensors, each sensor having an angle estimator and a cross-spectra term; a processor interfacing with the plurality of sensors and configured to receive a plurality of input signal from the sensors; an STFT module configured to apply a short-time Fourier transform to each of the plurality of input signals such that the input signals are in the time-frequency domain; a PCSD module configured to construct a Perpendicular Cross-Spectra Difference (PCSD) for each of the plurality of angle estimators associated with each sensor for each frequency bin and time index; an auxiliary observation module configured to calculate an auxiliary observation for each of the angle estimators; an impinging angle calculator configured to calculate the impinging angle for each of the angle estimators based on the auxiliary observation, the impinging angle calculator being configured to set the impinging angle to the empty set when the absolute value of the auxiliary observation is equal to or greater than 1, and a disambiguator configured to disambiguate impinging angle by associating one disambiguation cross-spectra term to each estimator to extract the correct impinging angle depending on the sign of the cross-spectra term.

A processor-readable tangible medium for capturing and reproducing spatial sound is also disclosed. The medium stores processor-issuable-and-generated instructions to: receive a signal at a sensor array having a plurality of spaced-apart sensors, each sensor having an angle estimator and a cross-spectra term; transform the input signal from each of the plurality of sensors to the time-frequency domain using a short-time Fourier transform; construct a Perpendicular Cross-Spectra Difference (PCSD) for each of the plurality of angle estimators associated with each sensor for each frequency bin and time index; calculate an auxiliary observation for each of the angle estimators; determine an impinging angle for each of the angle estimators based on the auxiliary observation, where the impinging angle is set equal to the empty set when the absolute value of the auxiliary observation greater than or equal to 1, and disambiguate the impinging angle by associating one disambiguation cross-spectra term to each system to extract the correct impinging angle depending on the sign of the cross-spectra term.

In one exemplary embodiment, at each Time Frequency point (TF) the method processes microphone signals to calculate cross-spectra along various directions, where the notion of cross-spectra along a specific direction refers to the fact that the cross-spectra is calculated at the output signals of two different microphones whose locations are such that the line segment connecting them has a certain direction.

The method uses these cross-spectra values to calculate perpendicular cross spectra differences (PCSD). Using the PCSD, the method then calculates auxiliary observation values. From observation, if the absolute value of the auxiliary observation is lower than a limit, then this value may potentially carry information which is useful for finding the source direction. Therefore, the method keeps the auxiliary observation values which satisfy these requirements but discards those that do not.

From each available auxiliary observation value the method may extract two possible directions of arrivals, without knowing which one is the true one direction of arrival (DOA). To find the true DOA, the sign of another cross-spectra term must be measured along the direction of maximum robustness of the an estimator. In the case of 4 and 8 sensors, it is possible to find one cross-spectra term extended parallel to the maximum robustness axis of each estimator.

At each TF point, there will be a minimum of 0 and a maximum of J possible DOA estimations (in practice, only one is needed). Based on an angular coherence metric, all possible combinations of angle estimates provided by different estimators can be formed to determine whether they are "coherent" or not. If they are, the most likely direction can be calculated and recorded before the method moves on to the next step, otherwise, no direction at all is kept for that particular TF point.

Estimates from all available TF points can already be collected (that is, angle estimates that conform with the criteria defined above) in order to form a histogram and then infer the DOAs from the peaks in the histogram. However, an additional step, explained below, may be applied to achieve even better DOA estimation.

Estimations from consecutive frequency bins can be grouped together and the angular coherence metric can again be sued, to see how "coherent" a certain group of estimates is. If the particular group of estimates has a coherence value above a threshold, then estimates can again be processed to extract the most likely direction from each group. This condition is in accordance with the belief that the dominance of a source in the TF domain appears not on unique-isolated frequency points but on a neighborhood of consecutive frequency bins that can be termed "zones." As a result, the number of available DOA estimates for forming the histogram is reduced, but the remaining angle estimates are expected to contain less outliers and be better centered around the true DOAs.

BRIEF DESCRIPTION OF THE DRAWINGS

The accompanying drawings illustrate various non-limiting, example, inventive aspects in accordance with the present disclosure:

FIG. 5 is a table showing the maximum robustness axis, solution and disambiguation criteria for each one of the four estimators corresponding to the square sensor array in one exemplary embodiment of the DOA Estimator;

Figure 8:
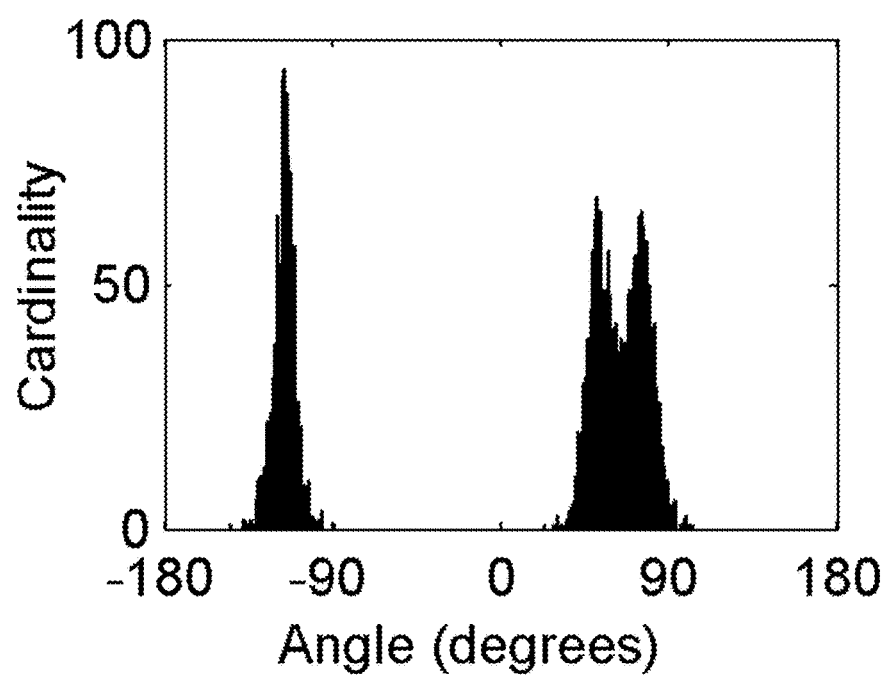
Figure 9:
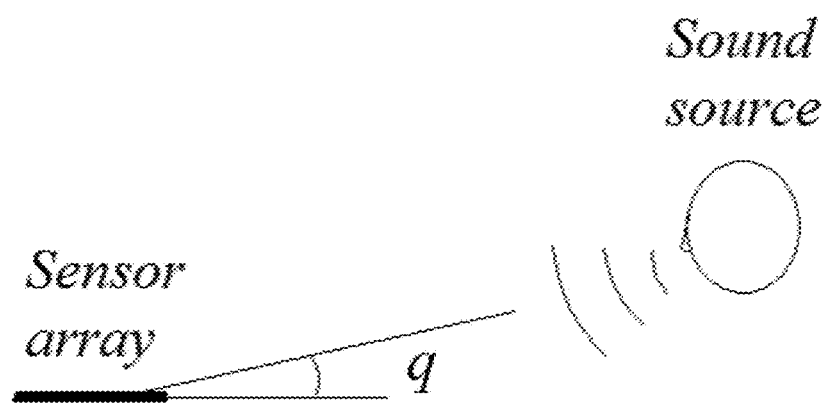
Figure 10:
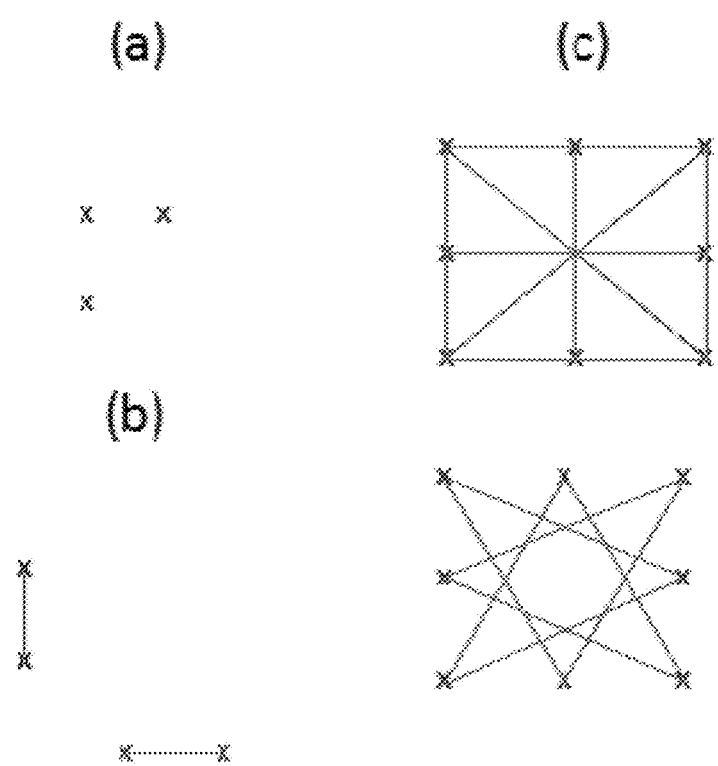
Figure 11:
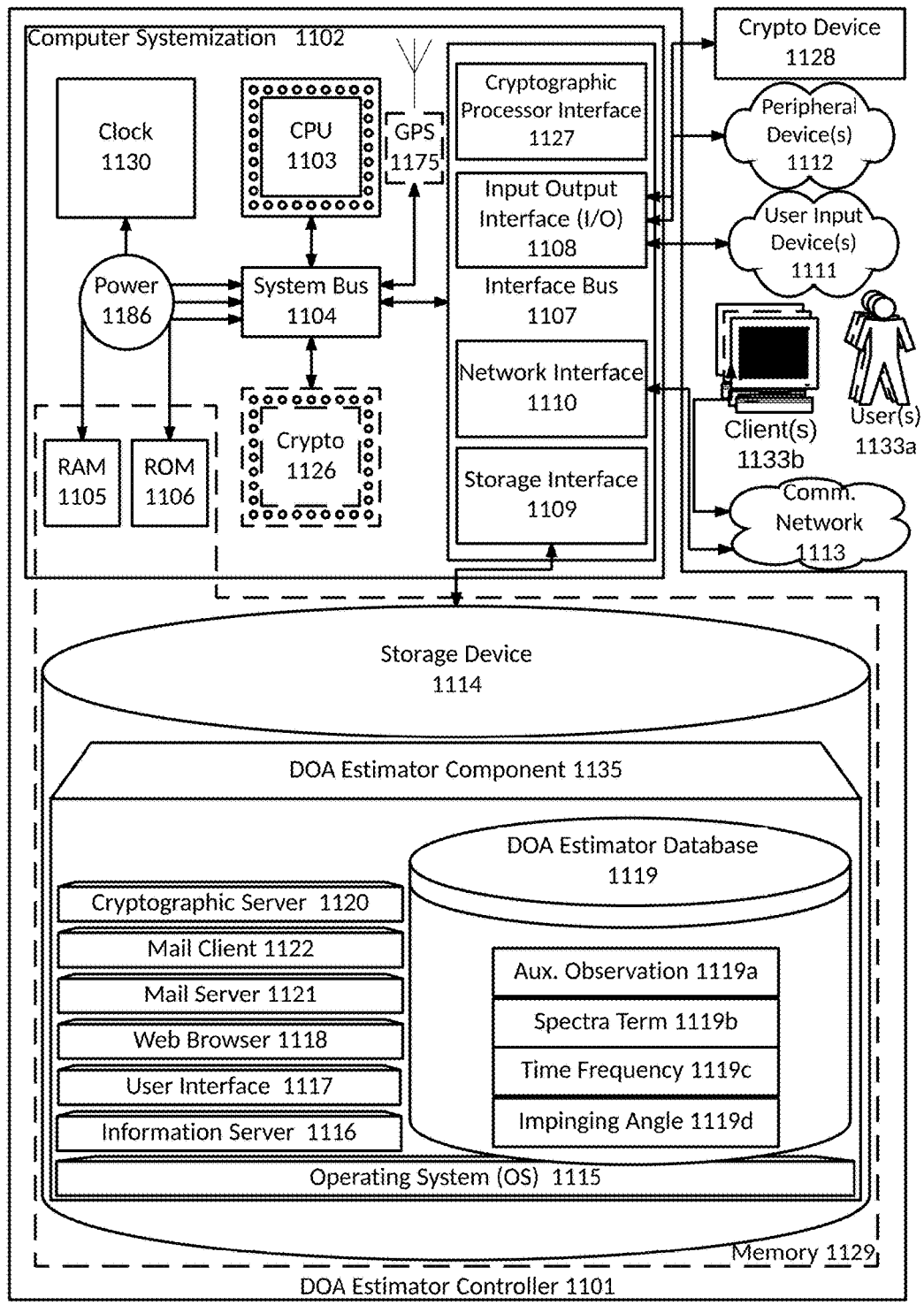

the angle values from all estimators may be processed synergistically to decide whether the particular TF point is a good point and if so, to associate a final local DOA $\alpha(\tau, \omega)$ to it;

FIG. 8 is an example of a histogram used in one embodiment of the DOA Estimator, showing three peaks corresponding to three sound sources at −115, 50 and 80 degrees;

FIG. 9 is a schematic diagram showing a sensor array and a sound source at an elevation angle q in one embodiment of the DOA Estimator;

FIG. 10 is an illustration of three different array types that may be used in various embodiments of the DOA Estimator; and FIG. 11 is a block diagram illustrating exemplary embodiments of an DOA Estimator controller.

DETAILED DESCRIPTION

DOA Estimator

Figure 1:
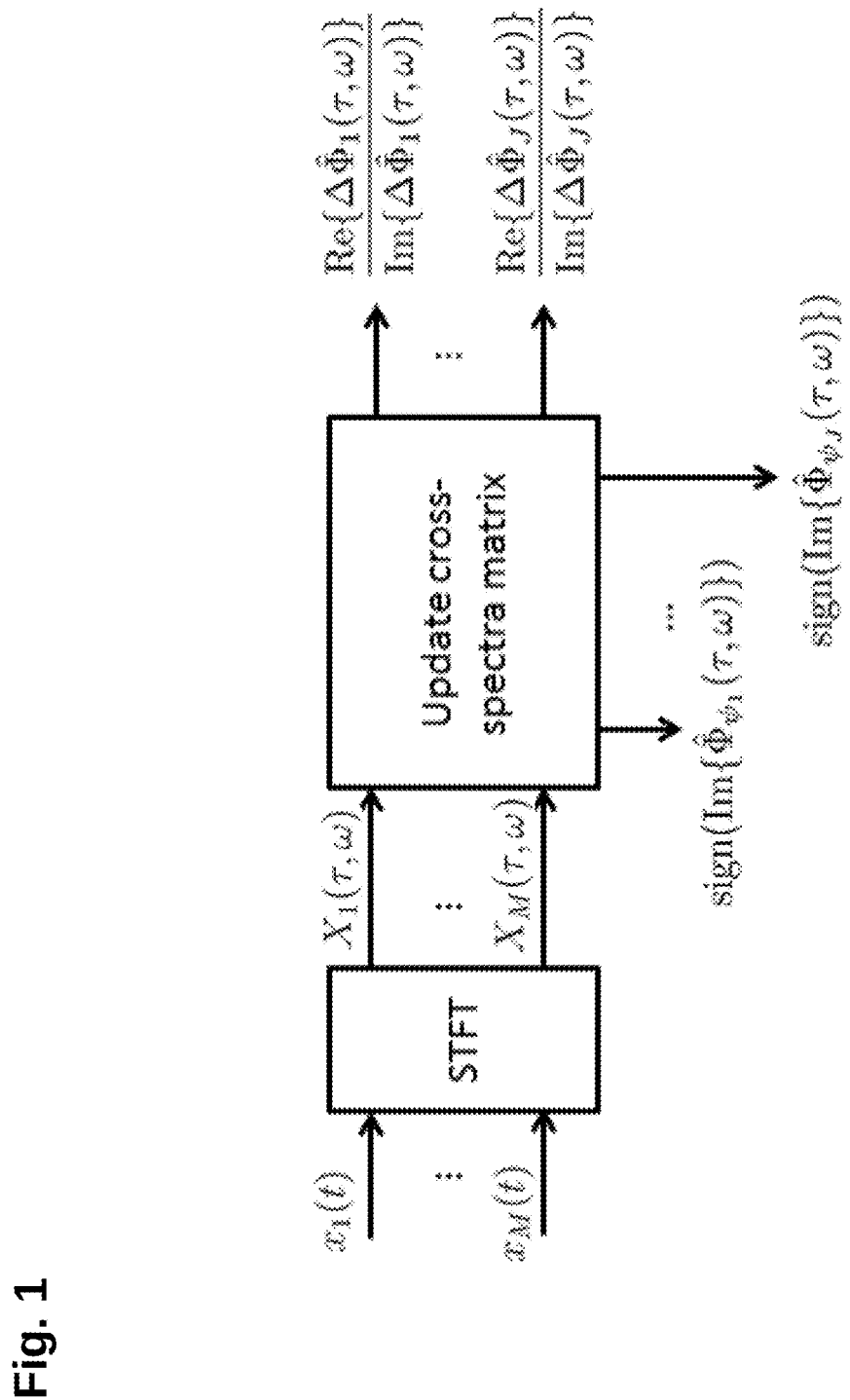
FIG. 1 shows a sensor array of M sensors resulting in J angle estimation systems and J corresponding disambiguation cross-spectra terms in one embodiment of the DOA Estimator.

Estimating the direction of arrival (DOA) of sound sources with respect to a sensor array is an essential task for many different applications. In one exemplary embodiment, the DOA Estimator implements a new DOA estimation technique that provides a closed-form solution for the unknown DOA based on a measurement of the inter-channel cross-spectra difference between pairs of sensors forming a perpendicular geometry. For example the DOA Estimator may use methods for real-time multiple sound source localization and counting. Such methods may be implemented in the time-frequency (TF) domain, which makes it particularly appealing for localizing multiple simultaneous broadband sound sources. The DOA Estimator may use a process that includes running short-time Fourier transform (STFT) applied to the input signals of a microphone, as illustrated in FIG. 1, showing a sensor array of M sensors resulting in J angle estimation systems and J corresponding disambiguation cross-spectra terms.

In one exemplary embodiment, the DOA Estimator employs a signal model that considers only one acoustic source. Furthermore, the DOA Estimator may use a basic propagation model which accounts for free-field plane wave propagation, meaning that it disregards the influence of reflections, sound diffraction, or scattering that might be introduced by the listening environment. Despite the limitations of the signal model, this disclosure will explain how the methods used by the DOA Estimator can be expected to perform sufficient sound source localization in real acoustic conditions, in the presence of multiple sound sources.

patentParagraph No DOA-estimation method can guarantee correct sound source localization under all conditions. Some assumptions regarding the sound sources and the listening environment must be met for most methods to work. One assumption is that of the time-frequency sparseness and dis-disjointness of the acoustic sources. This is a valid assumption for wideband sound sources such as speech; it dictates that at any time instant τ the signal emitted from the sound source will have most of its energy distributed over just a few frequency points. When thus multiple sources are active at the same time, each source will occupy different parts of the spectrum, and it is rather unlikely that two or more sources will have significant acoustic energy at the same time-frequency point. Working in time-frequency domain thus allows the DOA Estimator to break down a multiple sound source DOA-estimation problem into a single source DOA-estimation problem. It should be noted however that the assumption of time-frequency disjointness is valid only in conditions of low reverberation and does not hold in rooms with high reverberation time.

A sound source emits sound in all possible directions, and at a given instant in time, a part of the acoustic wave from the sound source will reach a sensor array. Depending on the array geometry and on the location of the source with respect to the sensor array, different sensors will capture the acoustic signal with different phase; these phase differences code the spatial information required for DOA estimation. Unfortunately, the acoustic wave emitted from the sound sources does not stop propagating at the sensor array. The wavefronts of the acoustic wave will continue traveling, for example, reaching the walls of a room they are traveling in, where they are then reflected back inside the room. As these reflections reach the sensor array, the sensor array phase differences may not be coding the spatial location of the actual source, but of the reflections, which may lead to erroneous angle estimates.

In one exemplary embodiment, there are several conditions that need to be simultaneously fulfilled for a portion of the captured microphone signal not to be in violation with the assumed sound field model: first, the captured microphone signal should contain signal from at most one sound source, and it should be "clean" from noise or reverberation. It is not necessary for the DOA Estimator to reach correct estimations at all time-frequency points to achieve satisfactory performance; it suffices to account for a select number of time-frequency points where the previous conditions are fulfilled. In one exemplary embodiment, the DOA Estimator provides a method for detecting the signal portions that are informative of the actual source locations and that will allow the DOA Estimator to discern whether the source locations violate the model, as will be described in greater detail below.

Throughout the rest of this specification, $(\cdot)^*$, $(\cdot)^T$ and $(\cdot)^H$, denote complex conjugation, transposition and Hermitian transposition respectively, while $\Im[\cdot]$ and $\Re[\cdot]$ denote the imaginary and real part of a complex number respectively. Signals are presented in the time frequency domain with $\omega \in \mathbb{R}$ and $\tau \in \mathbb{Z}$ denoting the angular frequency and the time-frame index respectively.

Consider a planar array of M sensors and let $r_m \in \mathbb{R}^2$, $m=1,\ldots,M$ denote the vector with the coordinates of each sensor. Now, let x be a vector in $\mathbb{Z}^2$ and $l_x = \|x\|_2$ be its length, with $\|\cdot\|_2$ denoting the Euclidean norm. Considering now all pairwise sensor combinations, ij, we define the set $F(x) = \{ij: r_j - r_i = x\}$ and let $N_x = |F(x)|$ denote the cardinality of that set. This set contains all sensor combinations which form line segments that have the same direction and length as x. In one exemplary embodiment x is chosen in accordance with the array topology. Now let $p_m(\tau, \omega)$ denote the signal received at the mth sensor at time $\tau$ and radial frequency $\omega$. Assuming that the set F(x) is not empty, we define the complex cross-spectra measure relevant to x as $$\hat{\Phi}_x(\tau, \omega) = \frac{1}{N_x} E\left\{ \sum_{ij \in F(x)} p_i(\tau, \omega) p_j^*(\tau, \omega) \right\}, \quad (1)$$

where $E\{\cdot\}$ denotes expectation. It is easy to observe that if there is a non-empty F(x), then neither F(−x) is empty and moreover, the property $\hat{\Phi}_x(\tau, \omega) = \hat{\Phi}_{-x}^*(\tau, \omega)$ holds.

The presented approach can be applied on planar sensor arrays of particular geometry; it is required that that the array has at least three sensors, and that among all the line segments that connect the centers of any sensor pair, there are line segments that are perpendicular to one another and equidistant. In other words, the method can be applied if there are at least two non-empty sets F(x) and F(y) such that $x \perp y$ and $l_x = l_y$. There are several array designs that fulfil these requirements (i.e. a square grid sensor).

In one embodiment, the DOA Estimator assumes that all sources and sensors are located on the azimuth plane and that the distance of the sound sources with respect to the center of the sensor array is large enough so that the far field assumption holds. Finally, in one embodiment, the DOA Estimator assumes that noise is uncorrelated to the source signals and also that the noise field is isotropic.

In one exemplary embodiment, the DOA Estimator assumes that the array receives a signal from a single acoustic source at an unknown direction in the presence of diffuse noise. By setting $s(\omega, \tau)$ as the source signal at a reference point, and s as the unit norm vector pointing from the source to the center of the sensor array (provided that the far field assumption holds). The observed signal at the mth sensor can be written as $$p_m(\tau, \omega) = s(\tau, \omega) d_m(\omega, \theta) + h_m(\tau, \omega) \quad (2)$$

where $d(\omega, \theta) = e^{j\omega \delta_m}$ is the steering vector with $\delta_m$ denoting the time of flight from the source to the mth microphone and $h_m(\tau, \omega)$ is the diffuse noise component at the same microphone. Now, assuming that the previous requirements are fulfilled for the two vectors $x, y \in \mathbb{R}^2$ the DOA Estimator may derive a model for the cross-spectra along x $$\Phi_x(\tau, \omega) = \Phi_{ss}(\tau, \omega) e^{jkx \cdot s} + \Psi_{l_x}(\tau, \omega), \quad (3)$$

and along the perpendicular direction of y as $$\Phi_y(\tau, \omega) = \Phi_{ss}(\tau, \omega) e^{jky \cdot s} + \Psi_{l_y}(\tau, \omega) \quad (4)$$

where $\Phi_{ss}(\tau, \omega) = E\{s(\tau, \omega) s^*(\tau, \omega)\}$ is the signal power spectrum and $\Psi_{l_x}, \Psi_{l_y}$ are the diffuse noise component of the cross-spectra. The subscript $l_x$ and $l_y$ are used here to denote that in an isotropic noise field, the second order statistics between two measurement points only depend on the distance between the two points. This means that the diffuse noise components are equal in both cross-spectra terms since $l_x = l_y$. Of particular interest i is the Perpendicular Cross-Spectra Difference (PCSD) defined as $$\Delta \Phi_{x,y}(\tau, \omega) = \Phi_x(\tau, \omega) - \Phi_y(\tau, \omega), \quad (5)$$

$$= \Phi_{ss}(\tau, \omega)(e^{jkx \cdot s} - e^{jky \cdot s}),$$

which has the very interesting property that the diffuse noise components vanish.

Figure 2:
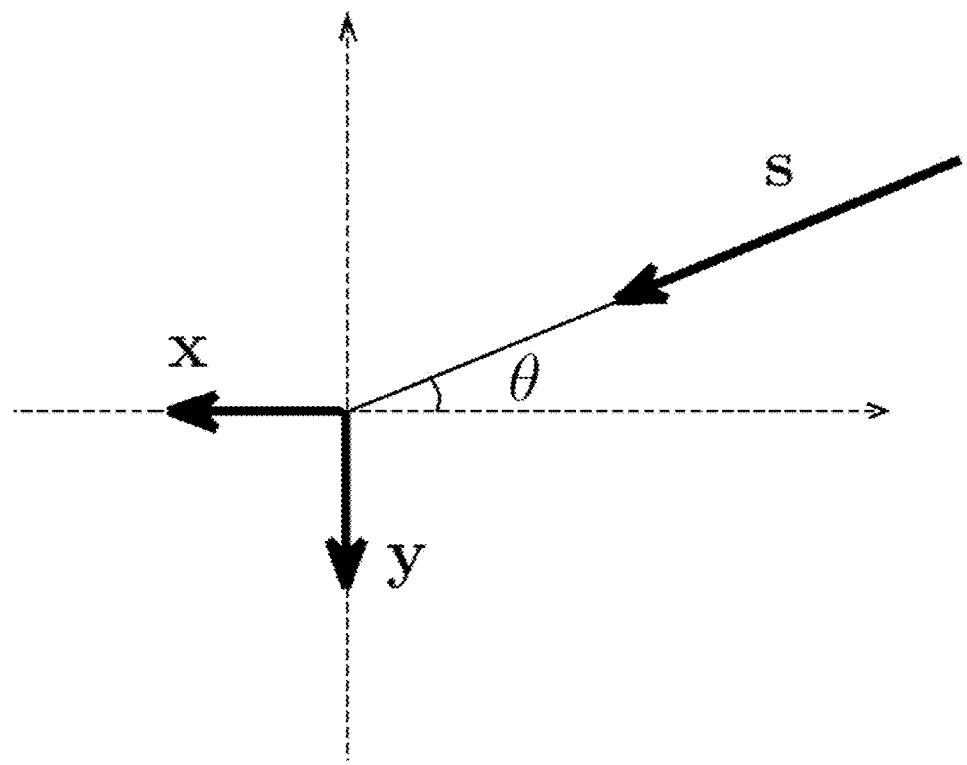
FIG. 2 shows a coordinate system and vector notation, as used in one embodiment of the DOA Estimator.

As shown in FIG. 2, without loss of generality, the DOA Estimator may assume that the x and y vectors are parallel to the x and y axis of a coordinate system. In what follows, the time-frame and frequency index $\tau$ and $\omega$ are omitted for convenience. In one exemplary embodiment, the DOA Estimator symbolizes the angle of the incident wave can with $\theta$ the and sets $d = l_x = l_y$ as the length of x and y respectively. The DOA Estimator may then define a model of the PCSD as $$\Delta \Phi_{x,y} = \Phi_{ss}(\cos(kd\cos(\theta)) - \cos(kd\sin(\theta))) + \quad (6)$$

$$j\Phi_{ss}(\sin(kd\cos(\theta)) - \sin(kd\sin(\theta))).$$

Consider now the ratio between the real and imaginary part of Eq. (6), this may be expressed as $$\frac{\Re\{\Delta\hat{\Phi}_{x,y}\}}{\Im\{\Delta\hat{\Phi}_{x,y}\}} = \frac{\cos(kd\cos(\theta)) - \cos(kd\sin(\theta))}{\sin(kd\cos(\theta)) - \sin(kd\sin(\theta))} \quad (7)$$

$$= -\tan\left(\frac{kd}{2}(\cos(\theta) + \sin(\theta))\right),$$

$$= -\tan\left(\frac{kd}{\sqrt{2}}\sin\left(\theta + \frac{\pi}{4}\right)\right).$$

Eq. (7) relates the impinging angle θ to the cross-spectra terms $\Phi_x$ and $\Phi_y$. The DOA Estimator can thus exploit Eq. (7) in order to derive a closed form solution for the unknown angle θ based on an estimation of $\Phi_x$ and $\Phi_y$ through Eq. (1). In one exemplary embodiment, the DOA Estimator may require, some additional information and may be required by the DOA Estimator because this operation involves inverse trigonometric functions which may be multivalued and highly nonlinear.

For the needs of DOA estimation, the first step required is to define the auxiliary observation $$z_{x,y} = \frac{\sqrt{2}}{kd}\tan^{-1}\left(\frac{\Re\{\Delta\hat{\Phi}_{x,y}\}}{\Im\{\Delta\hat{\Phi}_{x,y}\}}\right), \quad (8)$$

where function $\tan^{-1}(\bullet)$ is the inverse tangent function. Observe now from Eq. (7) that the auxiliary observation defined in Eq. (8) can be associated to the incident direction θ through $$-\sin\left(\theta + \frac{\pi}{4}\right) \leftarrow z_{x,y}, \quad (9)$$

which brings the DOA Estimator one step closer to an estimation of θ. When using the function $\tan^{-1}(\bullet)$, most computer programs will return a solution q such that $q \in (-\pi/2, \pi/2)$, and depending on the value of $$\frac{\sqrt{2}}{kd},$$

the auxiliary observation might not lie in the range [−1, 1] which is meaningful to the DOA Estimator according to Eq.(9). In one embodiment, the DOA Estimator handles this problem by disregarding auxiliary observations which are not within [−1, 1]. Furthermore, when using $\tan^{-1}(\bullet)$ to derive a value q, the DOA Estimator may ignore the additional solutions $q+k\pi$, $k \in \mathbb{Z}$, although these values may still lie in the [−1, 1] range. In one embodiment, the considered model actually dictates that cases corresponding to $k \neq 0$ can be ignored as long as the maximum frequency of investigation is not higher than $$f_A = \frac{c}{2\sqrt{(2)}\,d},$$

which might be been as an upper limit related to spatial aliasing.

The auxiliary observation $z_{x,y}$ together with function $$-\sin\left(\theta + \frac{\pi}{4}\right)$$

in Eq. (9) define an ambiguous closed form solution to the unknown direction θ, the ambiguity resulting from the fact that function $\sin^{-1}(\bullet)$ returns two candidate angles in [−π, π). An additional closed form solution may be constructed if instead of the cross-spectra measure $\hat{\Phi}_x$ [resp. $\hat{\Phi}_y$] the DOA Estimator employs $\hat{\Phi}_{-x}$ [resp. $\hat{\Phi}_{-y}$]. In another exemplary embodiment, when x=[−1, 0] is replaced with its mirror symmetric coordinate, −x=[1, 0], to measure $\Delta\hat{\Phi}_{-x,y}$, the DOA Estimator ends up with an additional ambiguous closed form solution of the form $$\sin(\pi/4 - \theta) \leftarrow z_{-x,y}, \quad (10)$$

with the auxiliary observation defined as $$z_{-x,y} = \frac{\sqrt{2}}{kd}\tan^{-1}\left(\frac{\Re\{\Delta\hat{\Phi}_{-x,y}\}}{\Im\{\Delta\hat{\Phi}_{-x,y}\}}\right). \quad (11)$$

As shown below, the two systems {x, y} and {−x, y} are not equivalent, and they lead to angle estimators with very different properties.

Based on Eqs. (9) and (10), the theoretical relation between the direction θ and the value of the auxiliary variable can be seen for each one of the two approaches in FIG. 3. The plot reflects the ambiguity associated with each one of the two angle estimation systems. In principle, if the DOA Estimator treats $z_{x,y}$ and $z_{-x,y}$ as the independent variables, the unknown direction θ can be estimated as $$\hat{\theta}_i = \sin_i^{-1}(-z_{x,y}) - \pi/4,$$

and $$\hat{\theta}_i = -\sin_i^{-1}(-z_{-x,y}) + \pi/4, \quad (12)$$

for the first and second system respectively, with subscript i here denoting that $\sin^{-1}(\bullet)$ is actually a multivalued function.

In the range [−π, π), two candidate directions $\hat{\theta}_1$ and $\hat{\theta}_2$ will rise for any of the two approaches, related through $\hat{\theta}_2 = \pi/2 - \hat{\theta}_1$ for {x, y} and through $\hat{\theta}_2 = -\pi/2 - \hat{\theta}_1$ for {−x, y}. In one embodiment, the DOA Estimator resolves this ambiguity by exploiting additional information in the cross-spectra terms.

At this stage, the DOA Estimator may also perform a basic analysis in order to quantify the sensitivity of each angle estimation system with respect to the actual value of the auxiliary variable when using Eqs. (9) and (10). In one embodiment, the DOA Estimator treats θ as the dependent variable considering that the auxiliary observation z is perturbed from its actual values by zero-mean random errors. The sensitivity of any of the two estimators in Eqs. (9) and (10) to these errors can be quantified in terms of the derivative $$\frac{d\sin^{-1}(z)}{dz} = \frac{1}{\sqrt{1-z^2}}, -1 \leq z \leq 1, \quad (13)$$

where the characteristic subscript $_{x,y}$ and $_{-x,y}$ is removed for convenience.

Figure 3:
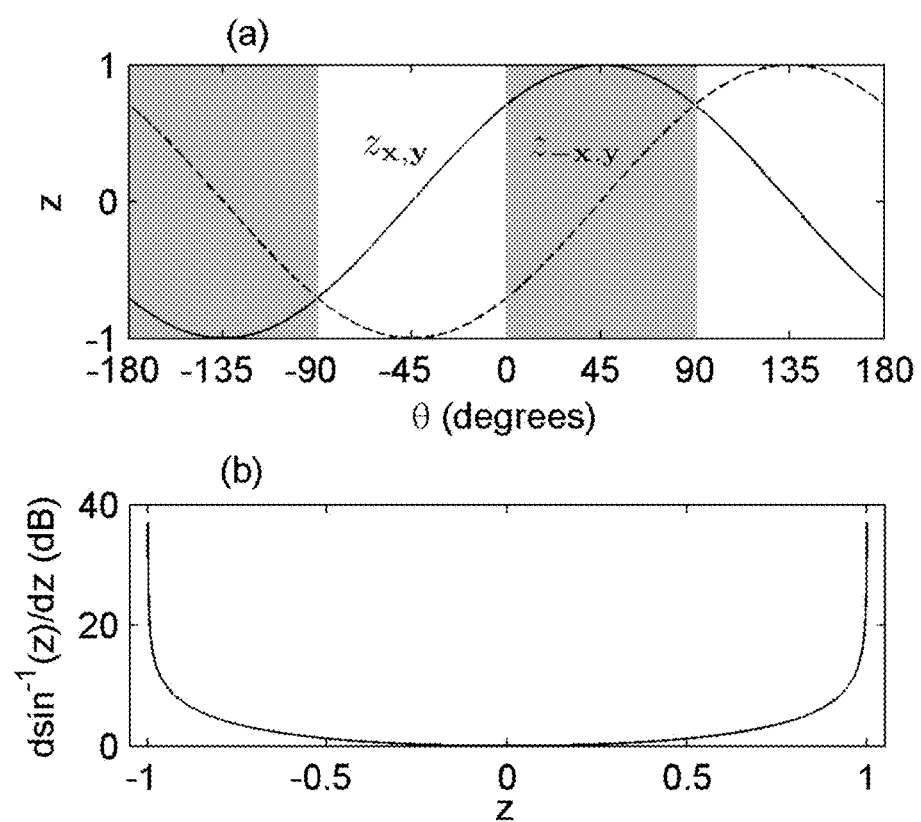
FIG. 3 shows the relation between direction of arrival (DOA) and auxiliary observation in one embodiment of the DOA Estimator for $E_{x,y}$ (solid line) and $E_{-x,y}$ (dashed line) in (a); and sensitivity of any of the two estimators as a function of the actual value of the auxiliary observation is shown in logarithmic scale in (b)

The sensitivity as a function of the actual value z is shown in logarithmic scale in FIG. 3(b), where it can be seen that a system is most accurate when its auxiliary observation is close to 0. This reflects the fact that function $\sin^{-1}(\phi)$ has the largest gradient when $\phi$ is close to ±1 and the smallest gradient when $\phi$ is close to 0. Combining information from both (a) and (b) of FIG. 3 indicates that Eq. (9) is completely unreliable for estimating the impinging angle when the source is at $\theta=45°$ or at $-135°$, while at the same time, Eq. (10) is least sensitive to errors at these angles. Similarly, Eq. (10) is completely unreliable for estimating the direction when the source is at $\theta=-45°$ or at $135°$, angles for which the first estimator shows maximum robustness to errors. In this sense, the line $y=-x$ defines a Maximum Robustness Axis (MRA) for system $\{x, y\}$ while the line $y=x$, a MRA for system $\{-x, y\}$. Extending these observations to the entire angle range, the gray regions in FIG. 3(a) indicate the angular sectors where $\{x, y\}$ is less sensitive to errors than $\{-x, y\}$, while the white regions indicate the angular sectors where system $\{-x, y\}$ is less sensitive to errors than $\{x, y\}$. Observe that in the gray [resp. white] regions $|z_{x,y}|<|z_{-x,y}|$ [resp. $|z_{-x,y}|<|z_{x,y}|$] holds.

Figure 4:
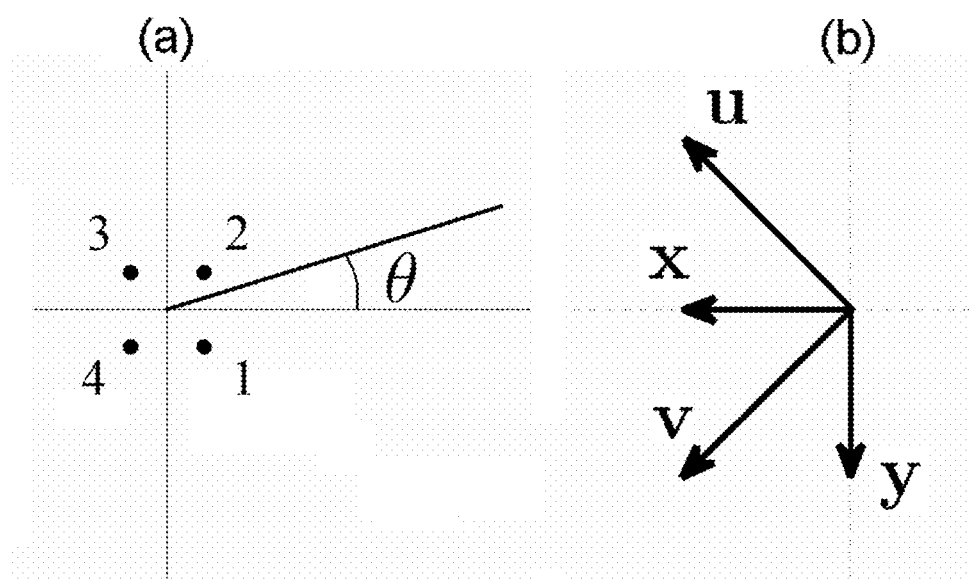
FIG. 4 shows a square sensor array configuration in (a) and corresponding vectors in (b) used in one exemplary embodiment of the DOA Estimator.

In one exemplary embodiment, the DOA Estimator may be applied to the case of a square array comprised of four sensors placed at the vertices of a square, as shown in FIG. 4(a). The following analysis is representative of how the method can be extended to a compact sensor array with more than three sensors.

Letting d be the side length of the square, the particular configurations allows the definition of four vectors; $x=[-d, 0]$, $y=[0, -d]$, $u=[-d, d]$ and $v=[-d, -d]$, all of which are shown in FIG. 4(b). In one exemplary embodiment, these four vectors may be combined by two in order to construct four DOA estimation systems; the pre-defined requirements are fulfilled in the sense that $x \perp y$, $l_x=l_y$, $=d$, and $u \perp v$, $l_u=l_v=\sqrt{2}d$ hold.

In this way, the DOA Estimator may define four cross-spectra terms $$\hat{\Phi}_x = 0.5(E\{p_1 p_4^* + p_2 p_3^*\}), \quad (14)$$

$$\hat{\Phi}_y = 0.5(E\{p_2 p_1 + p_3 p_4^*\}), \quad (15)$$

$$\hat{\Phi}_u = E\{p_2 p_4^*\}, \quad (16)$$

$$\hat{\Phi}_v = E\{p_2 p_4^*\}, \quad (17)$$

and use them to compose the two PCSDs $\Delta\hat{\Phi}_{x,y}$ and $\Delta\hat{\Phi}_{u,v}$ together with their mirror-symmetric ones $\Delta\hat{\Phi}_{-x,y}$ and $\Delta\hat{\Phi}_{-u,v}$. The link between the four auxiliary observations $z_{x,y}, z_{-x,y}, z_{u,v}$ and $z_{-u,v}$ and their corresponding closed form solutions is shown in the table in FIG. 5. While the lines $y=-x$ and $y=x$ correspond once more to the MRAs of systems $\{x, y\}$ and $\{-x, y\}$, the DOA Estimator now additionally has the lines $y=0$ and $x=0$ defining the MRAs of the two additional systems $\{u, v\}$ and $\{-u, v\}$.

In one embodiment, the DOA Estimator may be configured to solve the problem of the ambiguity related to the $\sin^{-1}(\cdot)$ function. Assuming, for example, that the actual direction of the incident plane wave is at 5°, then system $\{-u, v\}$ will return two candidate angles, at 5° and 175°. Interestingly, the two possible solutions indicate a flow of acoustic energy along almost opposite directions. An efficient way to detect the correct direction is by observing the sign of $\Im[\hat{\Phi}_x]$, which will be positive if 5° is the true angle and negative in the opposite case. In fact, there is one cross-spectra term which is perfectly aligned with respect to the MRA of each angle estimation system. Following this observation, the DOA Estimator may associate one disambiguation cross-spectra term to each system, as shown in the third row of the table in FIG. 5, and extract the correct angle depending on the sign of the cross-spectra term. This advantage of this approach is that the imaginary parts of the cross-spectra terms are immune to isotropic noise.

In one exemplary embodiment, the DOA Estimator has calculated $z_{-x,y}$ at TF point $(\tau, \omega)$ and now wants to associate it to a physical DOA $\hat{\theta}$. This will be allowed only if $|z_{-x,y}|<1$, otherwise the DOA for this TF point resulting from this estimator will be set equal to the empty set ($\emptyset$). Now, if $|z_{-x,y}|<1$ the DOA Estimator can estimate the impinging angle $\hat{\theta}_{-x,y}$ as $$\hat{\theta}_{-x,y} = \begin{cases} \theta^+, & \text{if sign}(\Im[\hat{\Phi}_u]) > 0 \\ \theta^-, & \text{if sign}(\Im[\hat{\Phi}_u]) < 0 \end{cases} \quad (18)$$

where, according to the table in FIG. 5, $\theta^+ = a\sin(-z_{x,y}) - \pi/4$ and $\theta^- = 3\pi/4 - a\sin(-z_{x,y})$, with function a $\sin(\cdot)$ being different from $\sin^{-1}(\cdot)$ in the sense that it returns only one solution in $[-\pi/2, \pi/2]$. The table of FIG. 5 shows maximum robustness axis, solution, and disambiguation criteria for each one of the four estimators corresponding to the square sensor array.

While the square array generates four angle estimation systems, DOA Estimator can generalize the method assuming an array of M sensors that provides with $J \geq 4$ angle estimation systems. Such a case is for example the 8-element circular sensor array shown in FIG. 10(c). Having J angle estimation systems means that the inter-channel cross-spectra terms can be combined in order to construct J different PCSDs, and that for the MRA associated with each PCSD the DOA Estimator can associate at least one disambiguation cross-spectra term. FIG. 1 illustrates the mathematical entities that are involved in the construction of a complete DOA estimation system. The input signal from the M sensors is transformed to the TF domain using the Short Time Frequency Transform (STFT). For the jth angle estimation system we calculate $$\frac{\Re\{\Delta\hat{\Phi}_j\}}{\Im\{\Delta\hat{\Phi}_j\}}$$

and we associate it to a disambiguation cross-spectra term $\Im\{\hat{\Phi}_{\Psi_j}\}$. From each angle estimation system we may derive one local DOA, a process that can be symbolized as:

$$\hat{\theta}_j = E_j(z_j), j=1, \ldots, J. \quad (19)$$

The full process for finding a direction specific to TF point $(\tau, \omega)$ and estimation system j can be written with more detail as follows: (1) calculate $z_j$ and if $|z_j| \geq 1$ set $\hat{\theta}_j = \emptyset$ otherwise proceed to the next step; (2) calculate the impinging angle $\hat{\theta}_j$ as $$\hat{\theta}_j = \begin{cases} \theta^+, & \text{if sign}(\Im[\hat{\Phi}_{\Psi_j}]) > 0 \\ \theta^-, & \text{if sign}(\Im[\hat{\Phi}_{\Psi_j}]) < 0 \end{cases} \quad (20)$$

The DOA Estimator may be configured to determine the values of θ+ and θ− directly in terms of an analytical formula which associates the auxiliary observation $z_j$ to the physical direction θ in accordance to the orientation of each estimation system, as in the example presented for the case of the square array. The final angle returned by each system will be a real number in (−π, π] if the absolute value of the corresponding auxiliary variable is lower than 1 and the empty set otherwise. This means that, at each TF point, the DOA Estimator will end up with a maximum of J or with a minimum of 0 potential angle values. This multiplicity of parameter values may be exploited by the DOA Estimator for discriminating "good" from "bad" TF points and for selecting the signal portions that favor the DOA estimation performance.

In one exemplary embodiment, given that there is a set of K≥2 angle values in rad $\Phi=[\phi_1, \ldots, \phi_K]$, the DOA Estimator may define the angular coherence for the collection of estimates Φ as $$C(\Phi) = \frac{1}{K}\left|\sum_{i=1}^{K} e^{j\phi_i}\right|. \quad (21)$$

In this embodiment, C(Φ)≤1 with the equality holding when all estimates are identical. In other words, a value close to 1 for C(Φ) indicates that all the phasors point in approximately the same direction. In one embodiment, the DOA Estimator may use this metric for TF point selection.

Figure 6:
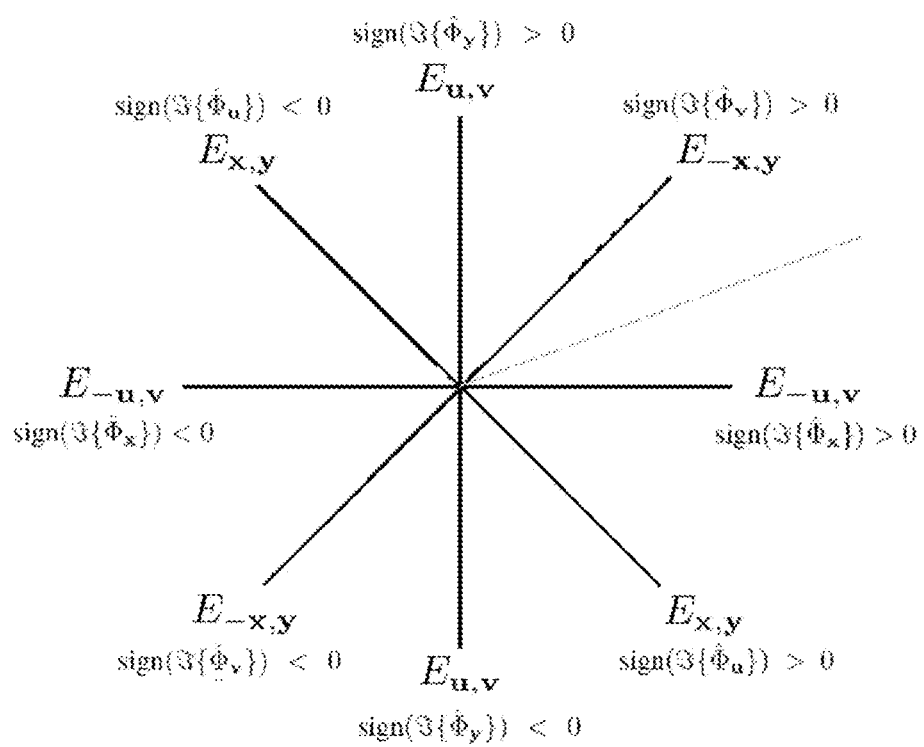
FIG. 6 shows the maximum robustness axes and corresponding disambiguation criteria for each one of the four estimators rising from the case of a square array in one exemplary embodiment of the DOA Estimator.

In one exemplary embodiment, the outcome of the local DOA estimation step explained above is a set of J elements, $\Phi=\{\hat{\theta}_1, \ldots, \hat{\theta}_J\}$ some of which might be the empty set Ø. Let the cardinality of this set be symbolized with K, then obviously 0≤K≤J holds. Let now L≤J be a user defined parameter. When K<L the DOA Estimator may completely disregard this TF point from the analysis, and no local direction estimation is stored, i.e. the DOA Estimator rejects the particular local DOA and sets α(τ, ω)=Ø. In the other case, the DOA Estimator calculates the angular coherence values (see Eq. (21)) across all combinations of L elements out of K in the set. The DOA Estimator then decides upon the set returning the highest angular coherence, whether a local DOA α(τ, ω) will be assigned to the particular TF point or not, according to the formula below:

$$\alpha = \begin{cases} \angle\left(\frac{1}{L}\sum_{i=1}^{L} e^{j\tilde{\phi}_i}\right), & C(\tilde{\Phi}) \geq 1-\epsilon \\ \emptyset, & \text{otherwise} \end{cases} \quad (22)$$

where <(•) denotes the angle of a complex number, $\tilde{\Phi}=\{\tilde{\Phi}_1, \ldots, \tilde{\Phi}_L\}$ is the set returning the highest angular coherence value $C(\tilde{\Phi})$ and $e=e_\theta$ is a predefined parameter. This approach exploits the availability of different angle estimates for the same TF point and is schematically represented in FIG. 6. In this embodiment, the DOA Estimator assumes that the DOAs returned by different estimators should converge to the same value if the particular TF point contains a strong directional component from a particular source. On the contrary, the DOAs will diverge to irrelevant values—leading to low angular coherence—when the particular TF point violates the sound field model due to overlapping sources, noise or reverberation. The greater the value of K and the smaller the value of e, the stricter the TF point selection criterion becomes, and fewer local DOAs α are accumulated across all available TF points.

The DOA Estimator may repeat the process across all frequency bins independently, leading to a large collection of DOAs at each time-frame τ. These estimates may be used by the DOA Estimator to form a histogram, for example as shown in FIG. 8, and the peaks of the histogram can be identified as potential source locations. While local DOA estimates can be processed independently for this purpose, in some cases, the estimation accuracy can be significantly improved by imposing a stricter condition, which requires the convergence of multiple local DOA estimates across a region of successive frequency bins. This condition is in accordance with the belief that the dominance of a source in the TF domain appears not on unique-isolated frequency points but on a neighborhood of consecutive frequency bins which can be termed "zones." In one embodiment, the DOA Estimator assumes that the nth zone is comprised of $P_n$ consecutive frequency bins, then by applying the previous step in this zone, ends up with the collection $\Theta_n=[\alpha_1, \ldots, \alpha_{P'}]$ of local DOAs (any empty sets in the collection are excluded), with P'≤$P_n$.

Similar to the decision process explained above, the condition for assigning a DOA to the particular zone is that there are P'≥$T_n$ entries in the nth set and that the angular coherence value of the set is greater than a threshold, i.e., $$\beta(\tau, n) = \begin{cases} \angle\left(\frac{1}{P'}\sum_{i=1}^{P'} e^{j\alpha_i}\right), & C(\Theta_n) \geq 1-\epsilon_\Theta \\ \emptyset, & \text{otherwise} \end{cases} \quad (23)$$

where $e_\Theta$ is again a predefined parameter. The zone specific DOA β(τ, n) provides the highest-level DOA information which is required for building the final collection, upon which multiple source localization and counting relies.

The DOA Estimator may account for each TF point independently or to work with frequency zones. In either case, the individual DOA estimates are processed in a similar manner to form a histogram; the information can be stacked in the collection B as $$B(\tau) \leftarrow B(\tau) \bigcup_{\omega=\omega_{LB}}^{\omega_{UB}} \alpha(\tau, \omega), \quad (24)$$

in the first case, or $$B(\tau) \leftarrow B(\tau) \cup_n \beta(\tau,n), \quad (25)$$

in the second one, where $\omega_{LB}$ and $\omega_{UB}$ in Eq. (24) denote a minimum and maximum frequency limit. In one exemplary embodiment, the DOA Estimator may disregard frequencies higher than a certain value in order to avoid spatial aliasing. The DOA collection may extend not only across many frequency bins or frequency zones, as Eqs. (24) and (25) imply, but also across multiple time frames. In this case, the final DOA estimation collection is constructed as $$\Gamma(\tau) = \cup_{t=\tau-H}^{\tau} B(t), \quad (26)$$

where H is an integer denoting the History Length (HL).

Figure 7:
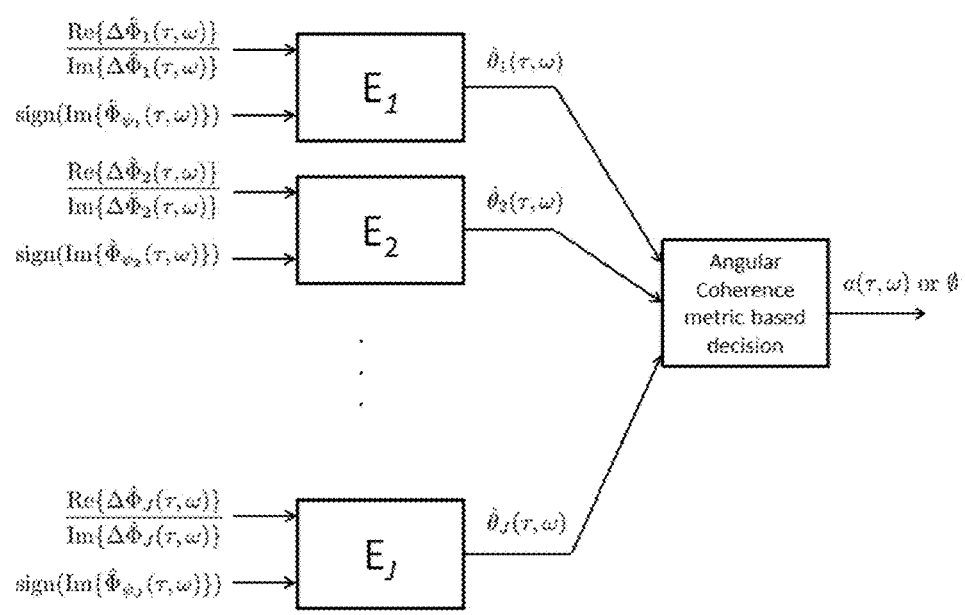
FIG. 7 shows an angular coherence based local DOA estimation used in one embodiment of the DOA Estimator.

The peaks in the histogram are then indicative of the number of active sound sources and of their actual locations. Source counting, i.e. estimating the number of active sources is an additional by-product of histogram processing. The histogram will vary dynamically in time, following the source activity. A snapshot of the histogram for HL=50 time frames in the case of three sources at −115, 50 and 80 degrees is shown in FIG. 7. As can be seen in the figure, there are three major peaks at the ground truth angles. In one application, a computer algorithm may be used to automatically detect the number of the peaks and their locations, using, for example, a histogram smoothing and peak picking approach. Alternatively, a more accurate but computationally demanding approach may be used where the individual DOA estimates are assumed to cluster around the ground truth angles following a certain distribution (i.e. Gaussian distribution with mean equal to the ground truth angle). An iterative approach is then proposed based on matching pursuit; when a source location is detected, the contribution of this source is removed from the histogram and the process is repeated until all the "hills" in the histogram have been removed. The process stops when the ratio of the "energy" remaining in the histogram to that subtracted from it is lower than a predefined threshold. This way, the source locations and their number may be jointly estimated.

In the exemplary embodiments discussed up to this point, the DOA Estimator has assumed that the sound sources are located on the same plane as the sensor array, and that the azimuth angle θ describes fully the source location with respect to the sensor array. In practice, sound sources may not lie on the azimuth plane; they might be at an elevation angle q∈(−90, 90), as shown in FIG. 9. In another exemplary embodiment, the DOA Estimator may be configured to implement an approach for estimating first the absolute value of q and then the value of θ by considering the square array of FIG. 4(a). This assumption modifies the original cross-spectra models. For example, considering system {x, y}, Eq. (7) should be rewritten as $$\frac{\Re\{\Delta\Phi_{x,y}\}}{\Im\{\Delta\Phi_{x,y}\}} = \frac{\cos(kd\cos(\theta)\cos(q)) - \cos(kd\sin(\theta)\cos(q))}{\sin(kd\cos(\theta)\cos(q)) - \sin(kd\sin(\theta)\cos(q))} \quad (27)$$
$$= -\tan\left(\frac{kd}{\sqrt{2}}\sin\left(\theta + \frac{\pi}{4}\right)\cos(q)\right).$$

For a non-zero elevation angle and for that particular embodiment of an angle estimation system, the association between the auxiliary variable and the acoustic source location reads $$-\sin(\theta - \pi/4)\cos(q) = z_{x,y}. \quad (28)$$

This produces one equation involving two unknown parameters θ and q. Solving for θ would require knowledge of q (or at least cos(q)) and vice versa. Interestingly, for the mirror symmetric system {−x, y}, the association between the source location and the auxiliary observation can be written as $$-\sin(\pi/4 - \theta)\cos(q) = z_{-x,y}. \quad (29)$$

It is now straightforward to see that for any θ and q $$z_{x,y}^2 + z_{-x,y}^2 = \cos^2(q), \quad (30)$$

holds, which means that the cosine of the elevation angle can be estimated as $$\cos(q) = \sqrt{z_{x,y}^2 + z_{-x,y}^2}, \quad (31)$$

leading to two solutions $q_1$ and $q_2$ which are related to one another through $q_1 = -q_2$. In Eq. (31) the solution $\cos(q) = -\sqrt{z_{x,y}^2 + z_{-x,y}^2}$ is ignored because it is assumed that q∈(−90, 90).

In one embodiment, the DOA Estimator is configured to use the estimation for cos(q) directly in order to solve for θ. For example, this may be accomplished by replacing the auxiliary observation $z_{x,y}$ with a new observation $z_{x,y}'$ such that $$z_{x,y}' = z_{x,y}/\cos(q). \quad (32)$$

The same can be done for all the other auxiliary observations related to different angle estimation systems. This way, the DOA Estimator can compensate for the presence of a non-zero elevation angle and the procedure for finding the azimuth locations θ of the sources can be followed as described above.

In one embodiment, the DOA Estimator may be configured to use Eq. (31) to estimate the unknown elevation angle at each TF point and then exploit this estimation in terms of Eq. (32) to facilitate the azimuth angle estimation process. Alternatively, a fixed elevation angle q may be provided by the user, which the DOA Estimator can then directly insert in the sound field model by replacing the definition of the auxiliary observation as in Eq. (32).

The process described here can be generalized for any array topology which fulfils the conditions described in this disclosure in the sense that any auxiliary observation j and its mirror symmetric one j″ should obey $$z_j^2 + z_{j''}^2 = \cos(q). \quad (33)$$

A by-product of the last equation is that $$z_j^2 + z_{j''}^2 \leq 1, \quad (34)$$

which in combination with $z_j \leq 1 \ \forall_j$ may be seen as an additional constraint for rejecting TF points which violate the considered sound field model.

The method presented may be extended to additional array geometries, as long sensors can be combined to form linear segments which are perpendicular to one another. For example, one design is the F-like array in FIG. 10(a) which exploits only three sensors. This design involves a single pair of mirror symmetric angle estimation systems, as does the design in FIG. 10(b). In the four-sensor design shown in FIG. 10(b), the distance between the sensor pairs can be arbitrary, as long as the far-field assumption is fulfilled. Finally, a square of eight sensor is shown in FIG. 10(c). This design occupies the same four MRAs of the square-array, plus four additional MRAs, emerging from combining sensors in the way shown in the bottom of FIG. 10. As the number of sensors increases, so does the number of the available angle estimation systems.

In the general case, each one of the J auxiliary observations $z_j$ will be associated with two vectors, say $x_j$ and $y_j$ which are perpendicular to one another and are formed by combining pairs of sensors. The cross-spectra along direction $x_j$ is calculated with the general formula $$\hat{\Phi}_{x_j}(\tau, \omega) = \frac{1}{N_{x_j}} E\left\{\sum_{ij \in F(x)} p_i(\tau, \omega) p_j^*(\tau, \omega)\right\}, \quad (35)$$

and that along $y_j$ as $$\hat{\Phi}_{x_j}(\tau, \omega) = \frac{1}{N_{x_j}} E\left\{\sum_{ij \in F(x)} p_i(\tau, \omega) p_j^*(\tau, \omega)\right\}, \quad (36)$$

where E denotes expectation and in practice can be replaced with time averaging. We can then calculate the jth auxiliary variable as $$z_j = \frac{\sqrt{2}}{kd} \tan^{-1}\left(\frac{\Re\{\Delta\hat{\Phi}_{x_j,y_j}\}}{\Im\{\Delta\hat{\Phi}_{x_j,y_j}\}}\right), \tag{37}$$

where $k=\omega/c$ is the wavelength (c is the speed of sound) and d is the distance between sensor pairs in meters.

In one exemplary embodiment, estimation of the DOA is formulated using trigonometric functions specific to each auxiliary variable and thus to each estimator. The formulas for $\theta^+$ and $\theta^-$ required for each estimator (as in FIG. 5) may be defined based on applying the rules of trigonometry. In this embodiment, the resulting formulas will be of the form a $\sin(-z_j)$+const, where $-\pi \leq$const$\leq \pi$ is a constant which depends on the orientation of $x_j$ and $y_j$ and a $\sin(\bullet)$ is the inverse-sine function which returns one solution in $[-\pi/2, \pi/2]$.

Both arrangements (a) and (b) in FIG. 10 are useful as an ambiguous DOA estimation system in the sense that the DOA Estimator may exploit a-priori information about the sound source direction to find the actual DOA. For example, if the possible source directions are constrained in a range $\theta_L \leq \theta \leq \theta_H$ so that $|\theta_L - \theta_H| < \pi/2$, then at most one of $\theta^+$ and $\theta^-$ will lie in the range $[\theta_L, \theta_H]$, thus reflecting the true DOA.

Although the described methods and systems have been presented from the perspective of sound source localization, these methods and systems may also be applied in other applications related to sensor array signal processing or other fields. In particular, the information on the source locations may be crucial to applications aiming at producing an output signal. For example, in source separation, different portions of the captured microphone signal are assigned to one source or to another, depending on the different directions of arrival. Another important field where the presented methodology is applicable is in directional coding of audio. In this application, the sound scene captured with the microphone array is decomposed and distributed onto a number of available loudspeakers so that the reproduced sound field is as close as possible to the original sound field. The angular locations of the sound sources need again to be correctly estimated in order to present a listener with the correct spatial impression.

DOA Estimator Controller

FIG. 11 illustrates inventive aspects of an DOA Estimator controller 1101 in a block diagram. In this embodiment, the DOA Estimator controller 1101 may serve capture and reproduce spatial sound.

Typically, users, which may be people and/or other systems, may engage information technology systems (e.g., computers) to facilitate information processing. In turn, computers employ processors to process information; such processors 1103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DOA Estimator controller 1101 may be connected to and/or communicate with entities such as, but not limited to: one or more users from user input devices 1111; peripheral devices 1112; an optional cryptographic processor device 1128; and/or a communications network 1113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DOA Estimator controller 1101 may be based on computer systems that may comprise, but are not limited to, components such as: a computer systemization 1102 connected to memory 1129.

Computer Systemization

A computer systemization 1102 may comprise a clock 1130, central processing unit ("CPU(s)" and/or "processor(s)" (these terms are used interchangeable throughout the disclosure unless noted to the contrary)) 1103, a memory 1129 (e.g., a read only memory (ROM) 1106, a random access memory (RAM) 1105, etc.), and/or an interface bus 1107, and most frequently, although not necessarily, are all interconnected and/or communicating through a system bus 1104 on one or more (mother)board(s) 1102 having conductive and/or otherwise transportive circuit pathways through which instructions (e.g., binary encoded signals) may travel to effect communications, operations, storage, etc. Optionally, the computer systemization may be connected to an internal power source 1186. Optionally, a cryptographic processor 1126 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1129 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DOA Estimator controller and beyond through various interfaces. Should processing requirements dictate a greater amount speed and/or capacity, distributed processors (e.g., Distributed DOA Estimator), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DOA Estimator may be achieved by implementing a microcontroller such as CAST's R8051XC2 microcontroller; Intel's MCS 51 (i.e., 8051 microcontroller); and/or the like. Also, to implement certain features of the DOA Estimator, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DOA Estimator component collection (distributed or otherwise) and/or features may be implemented via the microprocessor and/or via embedded components; e.g., via ASIC, coprocessor, DSP, FPGA, and/or the like. Alternately, some implementations of the DOA Estimator may be implemented with embedded components that are configured and used to achieve a variety of features or signal processing.

Depending on the particular implementation, the embedded components may include software solutions, hardware solutions, and/or some combination of both hardware/software solutions. For example, DOA Estimator features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DOA Estimator features. A hierarchy of programmable interconnects allow logic blocks to be interconnected as needed by the DOA Estimator system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the DOA Estimator may be developed on regular FPGAs and then migrated into a fixed version that more resembles ASIC implementations. Alternate or coordinating implementations may migrate DOA Estimator controller features to a final ASIC instead of or in addition to FPGAs. Depending on the implementation all of the aforementioned embedded components and microprocessors may be considered the "CPU" and/or "processor" for the DOA Estimator.

Power Source

The power source 1186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 is connected to at least one of the interconnected subsequent components of the DOA Estimator thereby providing an electric current to all subsequent components. In one example, the power source 1186 is connected to the system bus component 1104. In an alternative embodiment, an outside power source 1186 is provided through a connection across the I/O 1108 interface. For example, a USB and/or IEEE 1394 connection carries both data and power across the connection and is therefore a suitable source of power.

Interface Adapters

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/or connect to a communications network 1113. Through a communications network 1113, the DOA Estimator controller is accessible through remote clients 1133b (e.g., computers with web browsers) by users 1133a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DOA Estimator), architectures may similarly be employed to pool, load balance, and/or otherwise increase the communicative bandwidth required by the DOA Estimator controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1110 may be used to engage with various communications network types 1113. For example, multiple network interfaces may be employed to allow for the communication over broadcast, multicast, and/or unicast networks.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1111 may be card readers, dongles, finger print readers, gloves, graphics tablets, joysticks, keyboards, mouse (mice), remote controls, retina readers, trackballs, trackpads, and/or the like.

Peripheral devices 1112 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the DOA Estimator controller may be embodied as an embedded, dedicated, and/or monitor-less (i.e., headless) device, wherein access would be provided over a network interface connection.

Cryptographic units such as, but not limited to, microcontrollers, processors 1126, interfaces 1127, and/or devices 1128 may be attached, and/or communicate with the DOA Estimator controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1129. However, memory is a fungible technology and resource, thus, any number of memory embodiments may be employed in lieu of or in concert with one another. It is to be understood that the DOA Estimator controller and/or a computer systemization may employ various forms of memory 1129. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1129 will include ROM 1106, RAM 1105, and a storage device 1114. A storage device 1114 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1129 may contain a collection of program and/or database components and/or data such as, but not limited to: operating system component(s) 1115 (operating system); information server component(s) 1116 (information server); user interface component(s) 1117 (user interface); Web browser component(s) 1118 (Web browser); DOA Estimator database(s) 1119; mail server component(s) 1121; mail client component(s) 1122; cryptographic server component(s) 1120 (cryptographic server); the DOA Estimator component(s) 1135; and/or the like (i.e., collectively a component collection). These components may be stored and accessed from the storage devices and/or from storage devices accessible through an interface bus. Although non-conventional program components such as those in the component collection, typically, are stored in a local storage device 1114, they may also be loaded and/or stored in memory such as: peripheral devices, RAM, remote storage facilities through a communications network, ROM, various forms of memory, and/or the like.

Operating System

The operating system component 1115 is an executable program component facilitating the operation of the DOA Estimator controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/ or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DOA Estimator controller to communicate with other entities through a communications network 1113. Various communication protocols may be used by the DOA Estimator controller as a subcarrier transport mechanism for interaction, such as, but not limited to: multicast, TCP/IP, UDP, unicast, and/or the like.

Information Server

An information server component 1116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DOA Estimator controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DOA Estimator database 1119, operating systems, other program components, user interfaces, Web browsers, and/or the like.

Access to the DOA Estimator database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DOA Estimator. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DOA Estimator as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the DOA Estimator enabled nodes. The combined application may be nugatory on systems employing standard Web browsers.

Mail Server

A mail server component 1121 is a stored program component that is executed by a CPU 1103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DOA Estimator.

Access to the DOA Estimator mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU 1103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU 1103, cryptographic processor 1126, cryptographic processor interface 1127, cryptographic processor device 1128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DOA Estimator may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DOA Estimator component to engage in secure transactions if so desired. The cryptographic component facilitates the secure accessing of resources on the DOA Estimator and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DOA Estimator Database

The DOA Estimator database component 1119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DOA Estimator database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the DOA Estimator database is implemented as a data-structure, the use of the DOA Estimator database 1119 may be integrated into another component such as the DOA Estimator component 1135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1119 includes several tables 1119*a-d*, including a aux_observation table 1119*a*, a spectra_term table 1119*b*, a time_frequency table 1119*c*, and an impinging_angle table 1119*d*.

In one embodiment, the DOA Estimator database may interact with other database systems. For example, employing a distributed database system, queries and data access by search DOA Estimator component may treat the combination of the DOA Estimator database, an integrated data security layer database as a single database entity.

In one embodiment, user programs may contain various user interface primitives, which may serve to update the DOA Estimator. Also, various accounts may require custom database tables depending upon the environments and the types of clients the DOA Estimator may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1119a-d. The DOA Estimator may be configured to keep track of various settings, inputs, and parameters via database controllers.

The DOA Estimator database may communicate to and/or with other components in a component collection, including itself, and/or facilities of the like. Most frequently, the DOA Estimator database communicates with the DOA Estimator component, other program components, and/or the like. The database may contain, retain, and provide information regarding other nodes and data.

The DOA Estimators

The DOA Estimator component 1135 is a stored program component that is executed by a CPU. In one embodiment, the DOA Estimator component incorporates any and/or all combinations of the aspects of the DOA Estimator that was discussed in the previous figures. As such, the DOA Estimator affects accessing, obtaining and the provision of information, services, transactions, and/or the like across various communications networks.

The DOA Estimator component enables the determination of weights for constituents of index-linked financial portfolios, the acquisition and/or maintenance/management of those constituents, the determination of market values and/or returns associated with the indices, the generation of financial products based on the indices, and/or the like and use of the DOA Estimator.

The DOA Estimator component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DOA Estimator server employs a cryptographic server to encrypt and decrypt communications. The DOA Estimator component may communicate to and/or with other components in a component collection, including itself, and/or facilities of the like. Most frequently, the DOA Estimator component communicates with the DOA Estimator database, operating systems, other program components, and/or the like. The DOA Estimator may contain, communicate, generate, obtain, and/or provide program component, system, user, and/or data communications, requests, and/or responses.

Distributed DOA Estimators

The structure and/or operation of any of the DOA Estimator node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DOA Estimator controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

To address various issues related to, and improve upon, previous work, the application is directed to DIRECTION OF ARRIVAL (DOA) ESTIMATION APPARATUSES, METHODS, AND SYSTEMS. The entirety of this application (including the Cover Page, Title, Headings, Field, Background, Summary, Brief Description of the Drawings, Detailed Description, Claims, Abstract, Figures, Appendices, and any other portion of the application) shows by way of illustration various embodiments. The advantages and features disclosed are representative; they are not exhaustive or exclusive. They are presented only to assist in understanding and teaching the claimed principles. It should be understood that they are not representative of all claimed inventions. As such, certain aspects of the invention have not been discussed herein. That alternate embodiments may not have been presented for a specific portion of the invention or that further undescribed alternate embodiments may be available for a portion of the invention is not a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope of the invention. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like. As such, it should be understood that advantages, embodiments, examples, functionality, features, logical aspects, organizational aspects, structural aspects, topological aspects, and other aspects of the disclosure are not to be considered limitations on the disclosure as defined by the claims or limitations on equivalents to the claims.

Depending on the particular needs and/or characteristics of an DOA Estimator user, various embodiments of the DOA Estimator may be implemented that enable a great deal of flexibility and customization. However, it is to be understood that the apparatuses, methods and systems discussed herein may be readily adapted and/or reconfigured for a wide variety of other applications and/or implementations. The exemplary embodiments discussed in this disclosure are not mutually exclusive and may be combined in any combination to implement the functions of the DOA Estimator.

The invention claimed is:

1. A processor-implemented method for direction-of-arrival estimation, the method comprising:
   receiving a plurality of input signals at a sensor array having a plurality of spaced-apart sensors, each sensor having an angle estimator and a cross-spectra term;
   transforming, using a processor, the input signal from each of the plurality of sensors to the time-frequency domain using a short-time Fourier transform;
   constructing, using a processor, a Perpendicular Cross-Spectra Difference (PCSD) for each of the plurality of angle estimators associated with each sensor for each frequency bin and time index;
   calculating, using a processor, an auxiliary observation for each of the angle estimators;
   determining, using a processor, an impinging angle for each of the angle estimators based on the auxiliary observation, where the impinging angle is set equal to the empty set when the absolute value of the auxiliary observation is greater or equal to 1, and
   disambiguating, using processor, the impinging angle when the absolute value of the auxiliary observation is less than 1 by associating one disambiguation cross-spectra term with each angle estimator to determine a correct impinging angle based on the sign of the cross-spectra term.

2. The method of claim 1, further comprising calculating angular coherence values across a combination of user-defined elements and deciding upon the set returning the highest angular coherence whether a local direction of origin will be assigned to a particular frequency bin and time index.

3. The method of claim 2, wherein calculating angular coherence values is repeated across all frequency bins independently, creating a plurality of direction-of-arrival estimates.

4. The method of claim 3, further comprising using the plurality of direction-of-arrival estimates to form a histogram configured to be used for determining potential source locations at the peaks of the histogram.

5. The method of claim 4, further comprising imposing a condition requiring the convergence of multiple local direction-of-arrival estimates across a region of successive frequency bins.

6. The method of claim 5, wherein the condition for assigning a direction-of-arrival to a region of successive frequency bins is that there are a predetermined number of entries whose angular coherence is greater than a predetermined threshold.

7. The method of claim 4, wherein determining potential source locations includes using histogram smoothing and peak picking techniques.

8. The method of claim 4, wherein determining potential source locations includes using an iterative approach that repeatedly removes a contribution of a source location from the histogram when the source location is detected, until all of the peaks of the histogram have been removed.

9. A system for direction-of-arrival estimation, the system comprising:
- a sensor array having a plurality of sensors, each sensor having an angle estimator and a cross-spectra term;
- a processor interfacing with the plurality of sensors and configured to receive a plurality of input signal from the sensors;
- an STFT module configured to apply a short-time Fourier transform to each of the plurality of input signals such that the input signals are in the time-frequency domain;
- a PCSD module configured to construct a Perpendicular Cross-Spectra Difference (PCSD) for each of the plurality of angle estimators associated with each sensor for each frequency bin and time index;
- an auxiliary observation module configured to calculate an auxiliary observation for each of the angle estimators;
- an impinging angle calculator configured to calculate the impinging angle for each of the angle estimators based on the auxiliary observation, the impinging angle calculator being configured to set the impinging angle to the empty set when the absolute value of the auxiliary observation is equal to or greater than 1, and
- a disambiguator configured to disambiguate impinging angle by associating one disambiguation cross-spectra term to each estimator to extract the correct impinging angle depending on the sign of the cross-spectra term.

10. The system of claim 9, further comprising an angular coherence module configured to calculate angular coherence values across a combination of user-defined elements and decide whether a local direction of origin will be assigned to a particular frequency bin and time index based on which set returns the highest angular coherence.

11. The system of claim 10, wherein the angular coherence module is further configured to repeat the process of calculating angular coherence values across all frequency bins independently, to create a plurality of direction-of-arrival estimates.

12. The system of claim 11, wherein the angular coherence module is further configured to use the plurality of direction-of-arrival estimates to form a histogram and use the histogram to determine potential source locations at the peaks of the histogram.

13. The system of claim 10, wherein the angular coherence module is configured to impose a condition requiring the convergence of multiple local direction-of-arrival estimates across a region of successive frequency bins.

14. The system of claim 13, wherein the condition for assigning a direction-of-arrival to a region of successive frequency bins is that there are a predetermined number of entries whose angular coherence is greater than a predetermined threshold.

15. The system of claim 12, wherein the angular coherence module is further configured to determine potential source locations by using histogram smoothing and peak picking techniques.

16. The system of claim 12, wherein the angular coherence module is further configured to determine potential source locations using an iterative approach that repeatedly removes a contribution of a source location from the histogram when the source location is detected, until all of the peaks of the histogram have been removed.

17. A non-transitory processor-readable tangible medium for capturing and reproducing spatial sound, the medium storing processor-issuable-and-generated instructions to:
- receive a signal at a sensor array having a plurality of spaced-apart sensors, each sensor having an angle estimator and a cross-spectra term;
- transform the input signal from each of the plurality of sensors to the time-frequency domain using a short-time Fourier transform;
- construct a Perpendicular Cross-Spectra Difference (PCSD) for each of the plurality of angle estimators associated with each sensor for each frequency bin and time index;
- calculate an auxiliary observation for each of the angle estimators;
- determine an impinging angle for each of the angle estimators based on the auxiliary observation, where the impinging angle is set equal to the empty set when the absolute value of the auxiliary observation greater than or equal to 1, and
- disambiguate the impinging angle by associating one disambiguation cross-spectra term to each system to extract the correct impinging angle depending on the sign of the cross-spectra term.

* * * * *